(12) United States Patent
Koszek

(10) Patent No.: US 10,778,634 B2
(45) Date of Patent: Sep. 15, 2020

(54) NON-INTERACTIVE E-MAIL VERIFICATION

(71) Applicant: salesforce.com, Inc., San Francisco, CA (US)

(72) Inventor: Wojciech Koszek, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 66 days.

(21) Appl. No.: 15/826,161

(22) Filed: Nov. 29, 2017

(65) Prior Publication Data

US 2019/0166084 A1 May 30, 2019

(51) Int. Cl.
*G06F 15/16* (2006.01)
*H04L 12/58* (2006.01)

(52) U.S. Cl.
CPC ............. *H04L 51/34* (2013.01); *H04L 51/12* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 8,261,061 B2* | 9/2012 | Leonard | ................... | H04L 51/00 380/277 |
| 8,639,930 B2* | 1/2014 | Stibel | ................... | G06Q 10/107 713/170 |
| 8,892,873 B1* | 11/2014 | Souza | ................... | H04L 9/3226 713/162 |
| 9,270,666 B2* | 2/2016 | Souza | ..................... | H04L 63/12 |
| 10,230,736 B2* | 3/2019 | Banerjee | ........... | H04W 12/0802 |
| 2002/0069247 A1* | 6/2002 | Paknad | .................. | G06Q 10/10 709/204 |
| 2009/0210444 A1* | 8/2009 | Bailey | .................... | G06Q 30/02 |
| 2009/0214034 A1* | 8/2009 | Mehrotra | .............. | H04L 51/063 380/255 |
| 2012/0331536 A1* | 12/2012 | Chabbewal | ........... | G06F 21/604 726/7 |
| 2013/0254856 A1* | 9/2013 | Krishan | ................ | H04L 63/083 726/6 |
| 2016/0005133 A1* | 1/2016 | Flynn | ..................... | H04L 63/123 705/319 |
| 2016/0321664 A1* | 11/2016 | Erickson | .............. | G03H 1/0011 |
| 2017/0214679 A1* | 7/2017 | Lin | ......................... | H04W 4/14 |
| 2017/0346829 A1* | 11/2017 | Gordon | ................ | H04L 63/102 |
| 2018/0268402 A1* | 9/2018 | Agrawal | ............ | G06Q 20/0855 |
| 2018/0270226 A1* | 9/2018 | Agrawal | ............... | H04W 12/08 |

* cited by examiner

*Primary Examiner* — Alicia Baturay
(74) *Attorney, Agent, or Firm* — Butzel Long

(57) ABSTRACT

Methods and apparatus for digital data processing verification include performing on a first digital data processor steps of receiving, from a web browser, an email address; sending a message to the email address; and transmitting, to the web browser, proxy software that causes the web browser to (i) query an email client executing on the second digital data processor with that browser, and (ii) send a verification code when the message is received by the email client. This avoids disruption of the user experience typical to prior art email-based verification.

20 Claims, 2 Drawing Sheets

NON-INTERACTIVE E-MAIL VERIFICATION

BACKGROUND

Field of Technology

This pertains to networked digital data processing systems and, more particularly, to verification of activities on web sites, such as the opening of user accounts.

Email is often used to verify user activities on web sites. It can be used, for example, to verify the activation of user accounts, as well as for account changes such as service-level upgrades/downgrades, password changes, and so forth. It can also be used for logins (e.g., in instances where two-factor authentication is in place), product purchase verification, and so forth, to name a few.

A user registering for an account on a website, for example, is typically expected to provide an email address to the site via the user's web browser. The website server subsequently sends a verification notice to that email address and, in order to complete the registration, the user must respond to that notice by clicking a link, by replying to the verification email or otherwise. This disrupts the user experience and, unless the user is attentive, may not result in verification necessary to complete of the user activity, i.e., in this example, account activation.

BRIEF DESCRIPTION OF THE DRAWINGS

A more complete understanding of the discussion that follows may be attained by reference to the drawings, in which.

DETAILED DESCRIPTION OF THE ILLUSTRATED EMBODIMENT

Figure 1:
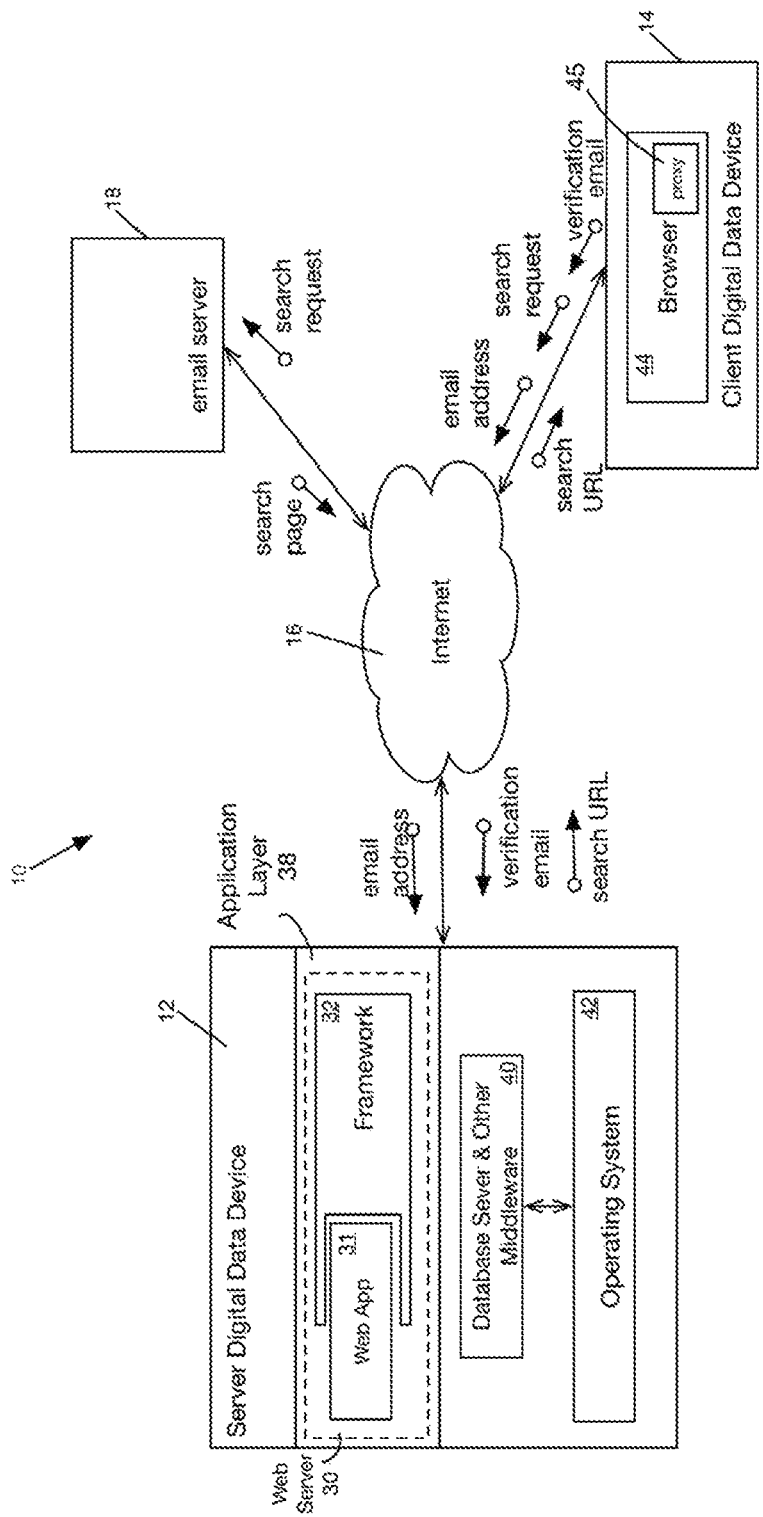
FIG. 1 depicts a digital data processing system of the type providing an example embodiment.

FIG. 1 depicts a digital data processing system 10 of the type providing an example embodiment that includes server digital data device ("server") 12 that is coupled to a client digital data device ("client") 14 via a network 16. Also coupled to server 12 and client 14 via network 16 is an email server digital data device ("email server") 18.

Devices 12, 14, 18 comprise conventional desktop computers, workstations, minicomputers, laptop computers, tablet computers, PDAs, mobile phones or other digital data devices of the type that are commercially available in the marketplace, all as adapted in accord with the teachings hereof. Thus, each comprises central processing, memory, and input/output subsections (not shown here) of the type known in the art and suitable for (i) executing software of the type known in the art (e.g., applications software, operating systems, and/or middleware, as applicable) as adapted in accord with the teachings hereof and (ii) communicating over network 16 to one or more of the other devices 12, 14, 18 in the conventional manner known in the art as adapted in accord with the teachings hereof.

Examples of such software include web server 30 that executes on device 12 and that responds to requests in HTTP or other protocols for transferring web pages, downloads and other digital content to a requesting device, e.g., client 14, over network 16, in the conventional manner known in the art as adapted in accord with the teachings hereof. The web server 30 can also respond to requests in such protocols for carrying out user-requested activities, such as, verifying activation of user accounts, effecting account changes (e.g., service-level upgrades/downgrades and password changes), verifying logins and product purchases, and so forth, all by way of non-limiting example, and all in the conventional manner known in the art as adapted in accord with the teachings hereof.

In the illustrated embodiment, web server 30 comprises web application 31 executing on device 12 within and/or in connection with a web application framework 32. Web application 31 comprises conventional such software known in the art as adapted in accord with the teachings hereof for effecting specific behavior by the server 12 in response to requests from the client 14 at the behest of users thereof. Web framework 32 comprises conventional such software known in the art (as adapted in accord with the teachings hereof) providing libraries and other reusable services that are (or can be) employed—e.g., via an applications program interface (API) or otherwise—by multiple and/or a variety of web applications, only one of which is shown here (to wit, web application 31).

In the illustrated embodiment, web server 30 and its constituent components, web application 31 and web application framework 32, execute within an application layer 38 of the server architecture. That layer 38, which provides services and supports communications protocols in the conventional manner known in the art as adapted in accord with the teachings hereof, can be distinct from other layers in the server architecture—layers that provide services and, more generally, resources (a/k/a "server resources") that are required by the web application 31 and/or framework 32 in order to process at least some of the requests received by server 30 from client 14. Those other layers include, for example, a data layer (which provides services supporting interaction with a database server 40 or other middleware in the conventional manner known in the art as adapted in accord with the teachings hereof) and the server's operating system 42 (which manages the server hardware and software resources and provides common services for software executing thereon in the conventional manner known in the art as adapted in accord with the teachings hereof). Other embodiments may utilize an architecture with a greater or lesser number of layers and/or with layers providing different respective functionalities than those illustrated here.

Though described herein in the context of a web server 30, in other embodiments applications 31 and 32 may define other functionality suitable for responding to user requests, e.g., a video server, a music server, or otherwise. And, though shown and discussed here as comprising web application 31 and web framework 32, in other embodiments, the web server 30 may combine the functionality of illustrated components 31 and 32 in a single component or distribute it among still more components.

With continued reference to FIG. 1, client device 14 of the illustrated embodiment executes a web browser 44 that typically operates under user control to generate requests in HTTP or other protocols, e.g., to download pages, activate user accounts, and so forth, and to transmit those requests to web server 30 over network 14. The web browser can also facilitate further user interaction with the web server 30, e.g., by presenting content received from the server 30 to the user and/or returning to the sever 30 user responses to that content—all in the conventional manner known in the art as adapted in accord with the teachings hereof. Though referred to here as a web browser, in other embodiments application 44 may comprise other functionality suitable for transmitting requests to a server 30 and/or presenting content received therefrom in response to those requests, e.g., a video player application, a music player application or otherwise.

Email server 18 is a conventional such device known in the art that routes to a designated client digital data device, e.g., 14, and, more specifically, to a designated user logged into such a device, an email message directed to that user, e.g., from another device, e.g., digital data device 12. The email server 18, which can be architected like device 12 or otherwise (albeit, for support of email routing software (not shown)), can include a web interface for display, creation and other management of emails, e.g., via browser 44 of client device 14, of logged-in users—all in the conventional manner known in the art as adapted in accord with the teachings hereof. Alternatively or in addition, the email server 18 can support an applications program interface (API) that can be used by third-party server devices and/or software (not shown) to support such a web interface for use, e.g., by such users to display, create and/or manage such email.

The devices 12, 14, 18 of the illustrated embodiment may be of the same type, though, more typically, they constitute a mix of devices of differing types. And, although only a single server digital data device 12 is depicted and described here, it will be appreciated that other embodiments may utilize a greater number of these devices, homogeneous, heterogeneous or otherwise, networked or otherwise, to perform the functions ascribed hereto to web server 30 and/or digital data processor 12. Likewise, although one client device 14 and one email server 18 is shown, it will be appreciated that other embodiments may utilize a greater or lesser number of those devices, homogeneous, heterogeneous or otherwise, running applications (e.g., 44) that are, themselves, as noted above, homogeneous, heterogeneous or otherwise. Moreover, one or more of devices 12, 14, 16 may be configured as and/or to provide a database system (including, for example, a multi-tenant database system) or other system or environment; and, although shown here in a client-server architecture, the devices 12, 14, 18 may be arranged to interrelate in a peer-to-peer, client-server or other protocol consistent with the teachings hereof.

Network 14 comprises one or more networks suitable for supporting communications between server 12, client device 14 and email server 18. The network comprises one or more arrangements of the type known in the art, e.g., local area networks (LANs), wide area networks (WANs), metropolitan area networks (MANs), and or Internet(s). Although a client-server architecture is shown in the drawing, the teachings hereof are applicable to digital data devices coupled for communications in other network architectures.

As those skilled in the art will appreciate the "software" referred to herein—including, by way of non-limiting example, web server 30 and its constituent components, web application 31 and web application framework 32, browser 44, proxy 45 (discussed below), email routing software executing on server 18—comprise computer programs (i.e., sets of computer instructions) stored on transitory and non-transitory machine-readable media of the type known in the art as adapted in accord with the teachings hereof, which computer programs cause the respective digital data devices, e.g., 12, 14 to perform the respective operations and functions attributed thereto herein. Such machine-readable media can include, by way of non-limiting example, hard drives, solid state drives, and so forth, coupled to the respective digital data devices 12, 14 in the conventional manner known in the art as adapted in accord with the teachings hereof.

In operation, server 12 and, more particularly, web server 30 initiates processing of an activity for a user of browser 44 executing on device 14. See, FIG. 2, step 100. This can be an activity initiated by the user (e.g., opening a new user account), by the web server 30 (e.g., a server-imposed requirement that the user change an expired password), or otherwise, as per convention in the art as adapted in accord with the teachings hereof.

In the illustrated embodiment, the client digital data device 14 and, more particularly, the browser 44 transmits the user's email address to the web server 30, which accepts that address for purposes of verifying the user activity. Step 102. This can be integral to the processing initiated in step 100, e.g., as where the web server 30 prompts the user, via browser 44, to provide an email address for express purposes of verifying the action, and where the browser 44 transmits back to the web server 30 the email address supplied by user—all, in the conventional manner known in the art as adapted in accord with the teachings hereof. Alternatively, it can be independent of that processing, e.g., as where the browser 44 transmits to the server 30 an address provided by the user in another context, again, all in the conventional manner known in the art as adapted in accord with the teachings hereof. Transmittal of the email address can be via HTTP or other protocol conventional in the art as adapted in accord with the teachings hereof.

In step 104, the web server 30 determines whether the email address accepted in step 102 is associated with a browser client, i.e., a web interface for at least display of logged-in users. If so, processing proceeds to step 106; otherwise, verification of the user activity can proceed in accord with the prior art or otherwise. The web server 30 can make the determination in step 104, e.g., by parsing the email address accepted in step 102 for a domain and extension associated with an email server 18 that provides such a web interface (e.g., google.com, yahoo.com, etc.) or by another mechanism within the ken of those skilled in the art as adapted in accord with the teachings hereof.

In step 106, the web server 30 generates a unique or quasi-unique code. This can be numeric, alphanumeric or otherwise, and it can be generated in a conventional manner known in the art (e.g., random number generation or otherwise) as adapted in accord with the teachings hereof. As will be appreciated in view of the discussion that follows, the code is sufficiently unique that its occurrence in an email message received by a user can be reasonably inferred to indicate that user received an email message generated and transmitted to him/her by server 30—e.g., as distinct from email messages generated by that server 30 and transmitted to other users and as distinct from email messages received by that user from other sources.

In step 108, the web server 30 generates and transmits on network 16 an email message that is directed to the address accepted in step 102 and that includes the code generated in step 106. Generation of such an email message is within the ken of those skilled in the art as adapted in view of the teachings hereof. The email message is routed via network 16 to email server 18 for access by the addressed user per convention in the art as adapted in accord with the teachings hereof.

In step 110, the web server 30 constructs a query for execution on the client device 14 and, more particularly, for execution within the browser 44. The query, which can be based on the URL of the email client or otherwise, is constructed so as to identify the email message sent by the web server 30 to the email server 18 in step 108. The query, which includes the code generated in step 106, is formatted in a manner specific to the email client itself. Thus, for example, a query generated in step 110 for a Gmail client would take the form: "https://mail.google.com/mail/. . . /search/XXXXXX", where, "XXXXXX" is the code generated in step 106. Queries for other email clients are correspondingly formatted for those clients. Generation of such a query, whether based on a URL (as in the case of a Gmail query given in the example) or otherwise is within the ken of those skilled in the art as adapted in view of the teachings hereof.

In the illustrated embodiment, the web server 30 transmits the query via network 16 to client device 14 for execution on the browser 44. This can be effected, by way of example, by embedding the query in proxy software (e.g., JAVASCRIPT or otherwise) suitable for execution within the browser 44, and by transmitting that proxy software to the client device 14 for execution via code injection or other mechanisms within the ken of those skilled in the art as adapted in accord with the teachings hereof. Alternatively, the query can be transmitted via network to client device 14 for execution by proxy software previously downloaded from web server 30, e.g., in response to a prior web page or other request made by the browser 44 to the server 30, and triggered for execution upon receipt of the query. Other mechanisms for execution of the query as part of such proxy software will be evident to those skilled in the art in view of and as adapted in accord with the teachings hereof.

As an alternative to transmission of a URL-based or other query, in alternative embodiments, the web server 30 in step 110 transmits the code generated in step 106 to the client device 14 and, more particularly, for example, to the web browser 44, which (i) constructs and executes the query in a same manner as discussed above and/or that utilizes that code generated in step 1 06 directly within proxy software previously downloaded from web server 30, or (ii) that otherwise uses the code generated in step 106 in connection with a query in a manner within the ken of those skilled in the art as adapted in accord with the teachings hereof.

Per the illustrated embodiment, the query is executed on client device 14 and, more particularly, by the browser 44, in step 112. This can include opening a window within that browser directed to the URL of the email client of server 18. This can be as part of execution of a URL-based query generated in step 110 or by execution of a separate URL against which the query generated in step 100 is directed. In the illustrated embodiment, the browser window opened in step 112 is hidden from user view, though, other embodiments may vary in that regard.

In step 114, the proxy software (depicted, here, as element 45) searches the window opened in step 112 for a "hit," indicating that the query executed in step 112 found the email message generated and sent in step 108. Such a search can be effected by parsing of the HTML stream returned from the email client 18 in response to the query or in another manner within the ken of those skilled in the art as adapted in accord with the teachings hereof. If the search reveals that email message, the proxy software can send a verification message to the web server 30, thereby, completing the user verification and permitting the process initiated by that server 30 in step 100 to go forward.

In one embodiment, proxy software 45 executing on or in connection with browser 44 can operate in accord with the following:

```
for (;;) {
    check if e-mail message with code generated in step
    106 in it has been delivered;
    if so: send verification message to server 30;
    if not and loop done 10 times: fail. Stop the loop and
    do not send verification message
}
If the foregoing returns an authorization failure (e.g.,
HTTP codes 401 or 403), then the user is redirected (HTTP
code 301) to the email server authorization page and is
required to login. In such case, after successful login,
the loop above is restarted.
```

Figure 2:
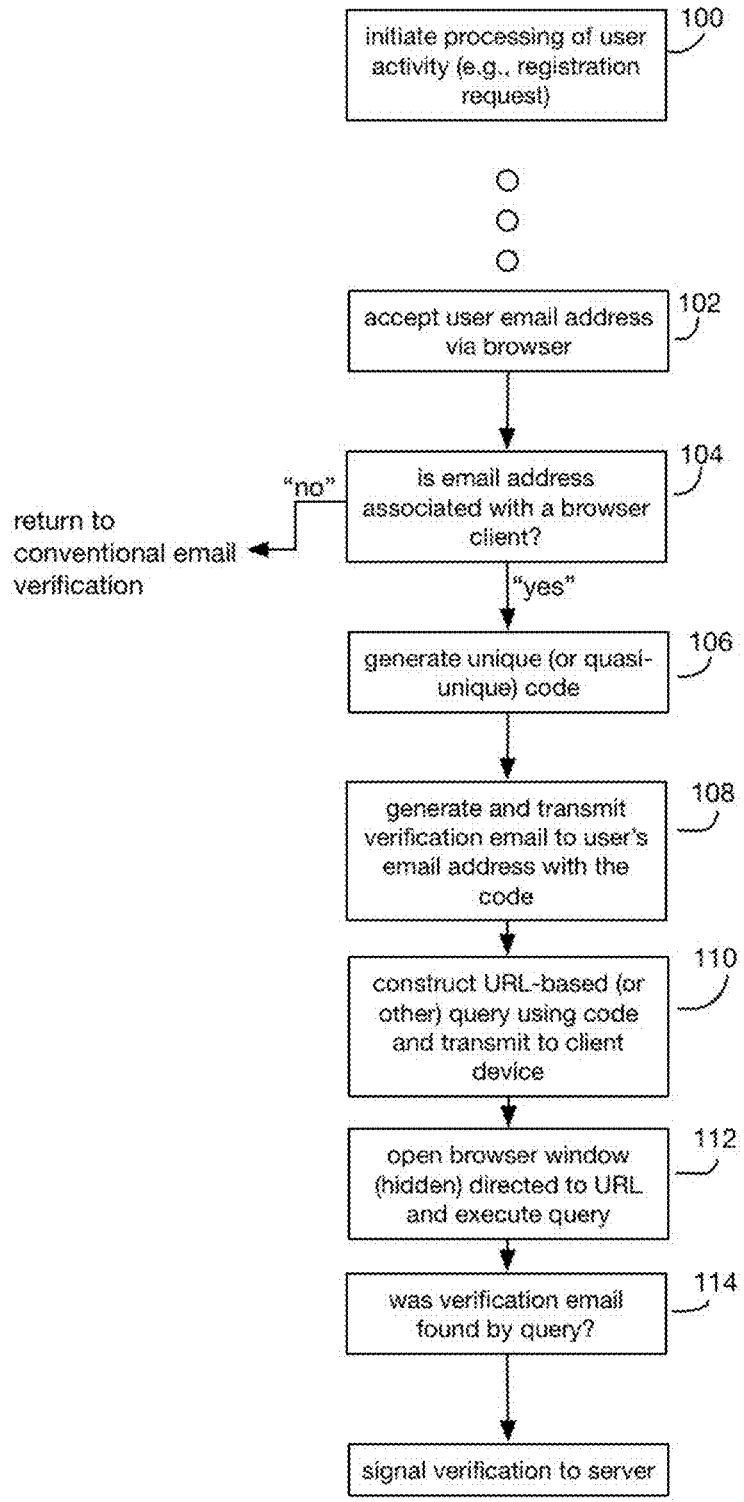
FIG. 2 is a flow chart depicting operation of the embodiment of FIG. 1.

A further appreciation of the steps shown in FIG. 2 and described above may be attained by reference to the "data arrows" shown in FIG. 1, reflecting the transmission of information among and between the respective devices depicted in that drawing.

Those skilled in the art will appreciate that the embodiments shown in the drawings and discussed above are merely illustrative and that other embodiments are contemplated, as well.

In view of the foregoing, what I claim is:

1. A digital data processing verification method comprising:
    performing on a first digital data processor:
        receiving, from a web browser of a client digital data device, an email address;
        subsequent to receiving the email address, generating one of a unique or quasi-unique identification code;
        sending a message that includes the identification code to the email address via an email client; and
        transmitting, to the web browser of the client digital data device, proxy software that causes the web browser to
            (i) query the email client for the sent message, and
            (ii) send a verification code when the web browser parses an HTML stream returned to the web browser from the email client in response to the query and finds an indication of the sent message.

2. The method of claim 1, further comprising performing on the first digital data processor:
    receiving the verification code; and
    taking, on receipt of verification code, an action requiring verification.

3. The method of claim 1, further comprising:
    receiving the email address from a second digital data processor on which the web browser is executing.

4. The method of claim 3, further comprising:
    sending the message to the email client.

5. The method of claim 3, wherein the proxy software further causes the web browser to send the verification code to the first digital data processor.

6. The method of claim 1, wherein the proxy software further causes the web browser to instantiate the email client in a browser window of the web browser.

7. The method of claim 6, wherein the proxy software further causes the web browser to instantiate the email client in the browser window in a visibly hidden form.

8. The method of claim 6, wherein the proxy software further causes the web browser to filter the email client for the message with the identification code.

9. The method of claim 1, further comprising:
    generating on the first digital data processor a URL that includes the identification code.

10. The method of claim 9, further comprising:
    transmitting the URL to the web browser, wherein the proxy software further causes the web browser to use the URL to at least one of filter and query the email client for the message that includes the identification code.

11. A non-transitory machine readable storage medium having stored thereon a computer program configured to cause a first digital data device to perform:
   receiving, from a web browser of a client digital data device, an email address;
   subsequent to receiving the email address, generating a unique or quasi-unique identification code;
   sending a message that includes the identification code to the email address via an email client; and
   transmitting, to the web browser of the client digital data device, proxy software that causes the web browser to
   (i) query the email client for the sent message, and
   (ii) send a verification code when the web browser parses an HTML stream returned to the web browser from the email client in response to the query and finds an indication of the sent message.

12. Computer instructions stored on a computer useable memory and configured to cause a first digital data device to perform:
   receiving, from a web browser of a client digital data device, an email address;
   subsequent to receiving the email address, generating a unique or quasi-unique identification code;
   message that includes the identification code to the email address via an email client; and
   transmitting, to the web browser of a client digital data device, proxy software that causes the web browser to
   (i) query the email client for the sent message, and
   (ii) send a verification code when the web browser parses an HTML stream returned to the web browser from the email client in response to the query and finds an indication of the sent message.

13. A digital data processing system, comprising:
   a first digital data processor and a second digital data processor, both of which are coupled for communications via one or more networks; and
   a web browser that executes on the second digital data processor and that transmits to the first digital data processor an email address,
   wherein the first digital processor is configured for
      generating a unique or quasi-unique identification code subsequent to receiving the email address,
      sending a message that includes the identification code to the email address via an email client; and
   transmitting, to the web browser, proxy software configured to cause the web browser to
      (i) query the email client for the sent message, and
      (ii) send a verification code when the web browser parses an HTML stream returned to the web browser from the email client in response to the query and finds an indication of the sent message.

14. The system of claim 13, wherein the first digital data processor is configured for transmitting the identification code to the web browser.

15. The system of claim 13, wherein the proxy software executing on the second digital data processor is configured for instantiating the email client in a browser window on the second digital data processor.

16. The system of claim 15, wherein the proxy software is further configured for instantiating the browser window in a visibly hidden form.

17. The system of claim 16, wherein the proxy software is further configured for causing the web browser to filter the email client for the message.

18. The system of claim 17, wherein the proxy software is further configured for causing the web browser to filter the email client using a URL that includes the identification code.

19. A digital data processing verification method comprising:
   performing on a first digital data processor steps of:
      receiving, from a web browser, an email address;
      sending a message to the email address;
      transmitting, to the web browser on a second digital data processor, proxy software that causes the web browser to
         (i) query an email client,
         (ii) instantiate the email client in a browser window of the web browser in a visibly hidden form, and
         (iii) send a verification code when the query returns the message from the email client.

20. A digital data processing system, comprising:
   a first digital data processor and a second digital data processor, both of which are coupled for communications via one or more networks; and
   a web browser that executes on the second digital data processor and that transmits to the first digital data processor an email address,
   wherein the first digital data processor is configured for
      generating and sending a message to the email address,
      transmitting, to the web browser, proxy software that causes the web browser to
         (i) query an email client,
         (ii) instantiate the email client in a browser window in a visibly hidden form, and
         (iii) send a verification code when the query returns the message from the email client.

* * * * *